(12) United States Patent
Morton et al.

(10) Patent No.: US 8,718,421 B2
(45) Date of Patent: *May 6, 2014

(54) SUPER-RING RESONATOR BASED DEVICES

(75) Inventors: Paul A. Morton, West Friendship, MD (US); Jacob Khurgin, Baltimore, MD (US)

(73) Assignee: Morton Photonics, West Friendship, MD (US)

( * ) Notice: Subject to any disclaimer, the term of this patent is extended or adjusted under 35 U.S.C. 154(b) by 434 days.

This patent is subject to a terminal disclaimer.

(21) Appl. No.: 13/044,669

(22) Filed: Mar. 10, 2011

(65) Prior Publication Data

US 2011/0164299 A1      Jul. 7, 2011

Related U.S. Application Data

(63) Continuation-in-part of application No. 12/897,219, filed on Oct. 4, 2010, now Pat. No. 8,406,586, which is a continuation-in-part of application No. 12/205,368, filed on Sep. 5, 2008, now Pat. No. 7,831,119.

(51) Int. Cl.
*G02B 6/26* (2006.01)
*G02B 6/42* (2006.01)

(52) U.S. Cl.
USPC ............................... 385/27; 385/32

(58) Field of Classification Search
USPC ...................................... 385/27, 32
See application file for complete search history.

(56) References Cited

U.S. PATENT DOCUMENTS

| | | | | |
|---|---|---|---|---|
| 6,668,006 | B1 * | 12/2003 | Margalit et al. | 372/97 |
| 7,277,179 | B2 * | 10/2007 | Deng et al. | 356/483 |
| 2005/0013537 | A1 * | 1/2005 | Yamazaki | 385/27 |
| 2005/0117842 | A1 * | 6/2005 | Takahashi et al. | 385/27 |
| 2006/0239633 | A1 * | 10/2006 | Montgomery et al. | 385/147 |

* cited by examiner

*Primary Examiner* — Uyen Chau N Le
*Assistant Examiner* — Chris Chu
(74) *Attorney, Agent, or Firm* — Nadya Reingand (57) ABSTRACT

This invention provides an optical device comprising a large group of non-uniform resonators operating cumulatively as a 'super-ring' to provide a controllable group delay with large bandwidth. The super-ring tuning is performed by a single control. The device may include two super-rings, each includes a large number of resonators with a resonant frequencies centered around $\omega_1$ and $\omega_2$ respectively. The invention provides multiple ways to improve the delay duration, bandwidth and the tuning speed, and overcomes the issue of non-uniformity of resonance frequency for devices incorporating multiple optical resonators.

22 Claims, 10 Drawing Sheets

SUPER-RING RESONATOR BASED DEVICES

CROSS-REFERENCE TO RELATED APPLICATIONS

The application is a continuation-in-art of U.S. patent application Ser. No. 12/897,219 filed Oct. 4, 2010 now U.S. Pat. No. 8,406,586, which is a continuation-in-part of U.S. patent application Ser. No. 12/205,368 filed Sep. 5, 2008.

STATEMENT REGARDING FEDERAL SPONSORED RESEARCH AND DEVELOPMENT

This invention was made with U.S. Government support under Contract W31P4Q-09-C0298 with DARPA MTO SBIR Project, and the U.S. Government has certain rights in the invention.

FIELD OF INVENTION

This invention relates to an active array antenna system for use in wireless communications. More particularly it addresses tunable delays to control phased array antennas.

BACKGROUND OF THE INVENTION

A phased array is a group of radio frequency antennas in which the relative phases of the respective signals feeding the antennas are varied in such a way that the effective radiation pattern of the array is reinforced in a desired direction and suppressed in undesired directions. In typical embodiments, they incorporate electronic, phase shifters that provide a differential delay or phase shift to adjacent radiating elements to tilt the radiated phase front and thereby produce far-field beams in different directions depending on the differential phase shifts applied to the individual elements.

A number of embodiments of delay lines and antenna elements can be arranged in an RF antenna assembly. The antenna assembly may include an array of the antenna elements. Such arrays of the antenna elements may, in certain embodiments, be spatially arranged in either non-uniform or uniform pattern to provide the desired antenna assembly characteristics. The configuration of the arrays of the antenna elements may affect the shape, strength, operation, and other characteristics of the waveform received or transmitted by the antenna assembly.

The antenna elements may be configured to either generate or receive RF signal. The physical structure of the element for signal generation and reception is similar, and typically a single element is used for both functions. A phase shifter/true time delay (PS/TTD) device is a crucial part of the antenna element providing a differential delay or phase shift to adjacent elements to tilt the radiated/received phase front.

Figure 1:
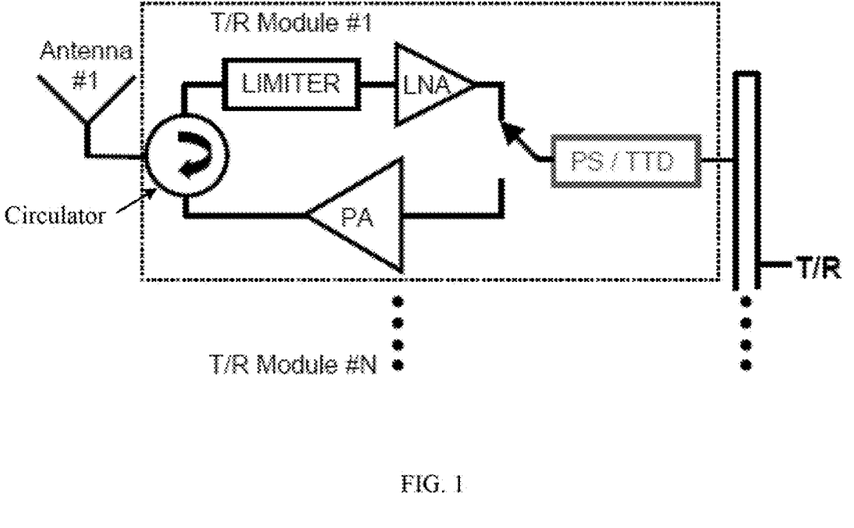
FIG. 1 A schematic of a transmitter/receiver module having an active phased array system with true time delay unit.

The active phased array antenna architecture is the most applicable to the use of the PS/TTD device. A schematic of one of the embodiments of an active phased array antenna unit is shown in FIG. 1. The antenna element is connected to a circulator, which is used to separate the high power transmit path and the low power receive path, providing the required isolation. The receive path includes a limiter to avoid damage from a high input level, followed by a low noise amplifier (LNA) used to bring the received signal up to the required power level. The output of the LNA passes through a transmit/receive switch, and then through the phase shifter/true time delay (PS/TTD) device, which provides the correct phasing for that element before the output is summed with that from all other elements. The PS/TTD provides the correct phase shifting of each antenna element at all frequencies. The overall phased array antenna output power is a coherent addition of the signals from each of the antenna elements. A large number of elements provide a large total power for the system.

The tunable delay application is not limited to active phased array antennas. Alternatively, PS/TTDs can be implemented in passive phased array systems, where the power is shared passively between many antenna elements, each having its own PS/TTD device.

Photonics technologies offer significant advantages over RF and microwave electronics, which can be exploited in phased array systems. Optics offer tremendous inherent bandwidth for use in optical processing and communicating systems, due to the very high carrier frequencies (e.g. 200 THz) compared to the microwave signals (10 s GHz) upon which they operate. Photonic technologies offer much lower cost if efficiently integrated. Photonic devices are inherently small due to the short wavelength at which they operate (around 1 micron) compared to the cm, and min wavelengths of microwave, integrated circuits in phased array systems. Photonic integration provides a path to massive parallelism, providing additional reductions in size and weight, together with the promise of much lower overall system cost.

Figure 2:
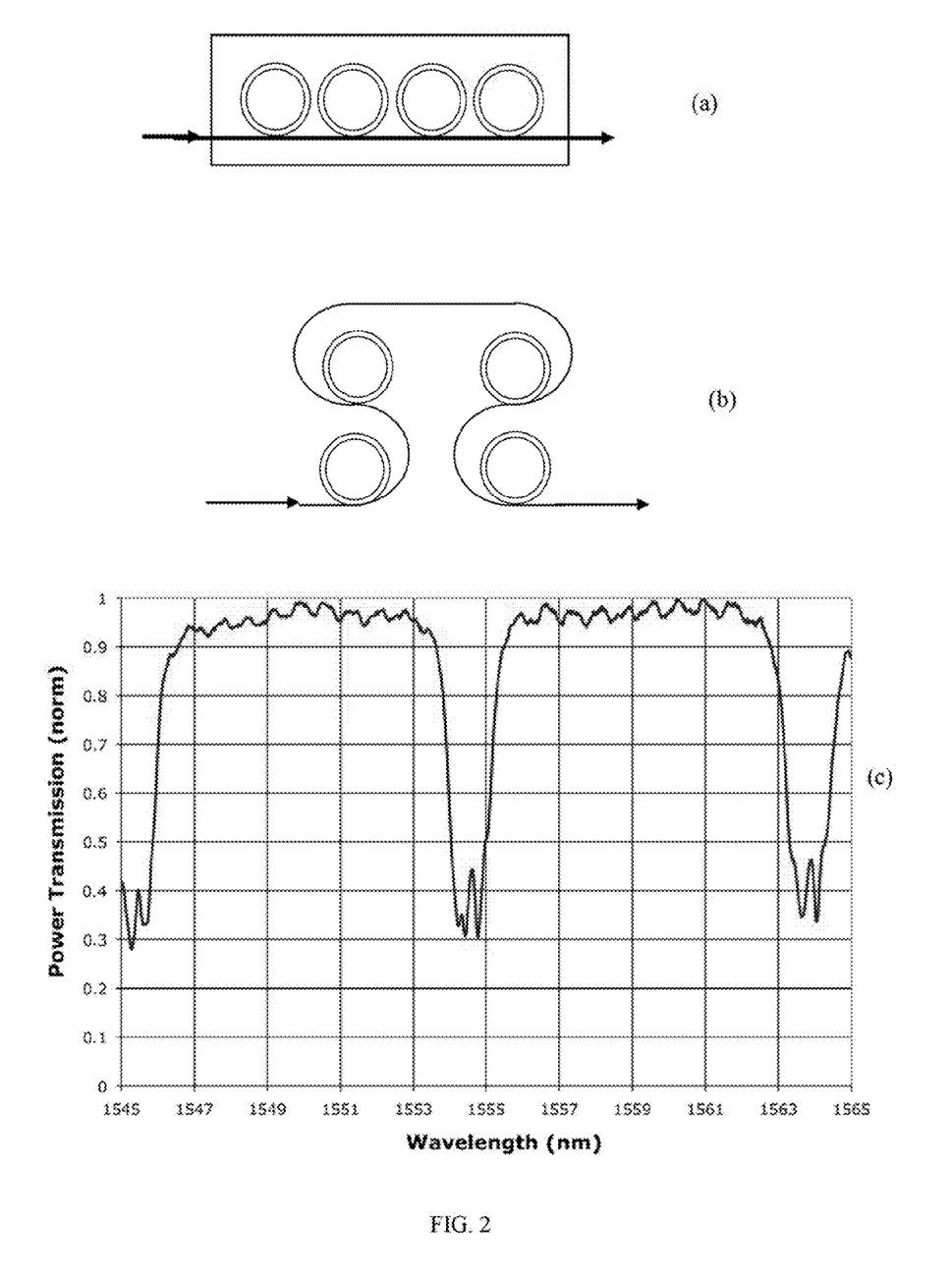

This invention relates to optical delay lines based on resonator structures, often reported in the literature as microresonator structures when describing resonators of small size. One of the most promising delay line designs is a 'side-coupled integrated spaced sequence of resonators' (SCISSOR) shown in FIG. 2 (a). SCISSOR structures are by definition all-pass filters with light propagating in only one direction, and thus they have zero reflection. U.S. Pat. No. 7,058,258 discloses an implementation of the side—coupled sequence of resonators for tunable dispersion compensation. It provides different group delays at different frequencies of the optical signal. The present invention addresses an opposite goal—to achieve exactly the same group delay over as wide range of frequencies as possible.

Another configuration (FIG. 2 (b)) of the side-coupled sequence of resonators was presented in U.S. Pat. No. 7,162,120, where the resonators are coupled to the opposite sides of the core waveguide. This configuration was designed only for the device compactness; there is no difference between the resonators on the both sides of the waveguide.

A multitude of phased array systems are used in many applications, varying from large surveillance systems to weapons guidance systems to guided missiles, plus many civil applications including weather monitoring radar systems, radio-astronomy and topography.

There is a need to provide more reliable and efficient devices for tunable delays to control phased array antennas. The best approach is in implementation of an optical device to provide extended bandwidth, cost reduction and compactness. As it was shown in our prior invention described in U.S. patent application Ser. No. 12/205,368, the tunability may be achieved either by the thermo-optical effect or by the quantum confined Stark effect or by carrier injection.

One of the key issues with using thermal tuning of a device, is that there are usually multiple time constants involved in the tuning, i.e. although the goal is to achieve fast (e.g. microsecond) tuning times, which may be achieved by the device structure itself, when it is done thermally there are typically much longer time constants also involved, due to the thermal mass of the whole device, the submount, the heatsink it is placed on, the cooling circuit that keeps the temperature constant etc. These much slower time constants, which can be as long as many seconds, cause changes in the device output on these longer timescales, which reduces the device performance, and in some applications makes the performance unacceptable.

There is a need to provide an improved tuning mechanism to achieve faster and more reliable performance.

A key issue with current manufacturing of resonators is the lack of uniformity of resonator response, in particular the lack of uniformity of resonator resonance frequency for identically designed resonators on the same device, additionally also the lack of uniformity of other performance parameters such as the amplitude of the response e.g. loss, delay, phase change and dispersion, and also the tuning performance of the response. An example of this non-uniformity in resonance frequency is shown in FIG. 2 (c), which is the measured transmission spectrum for a device with 10 identical resonators on it. Each individual resonator has a resonance dip close to 1555 nm, with a width of ~0.3 nm and a free-spectral range of ~9.5 nm. The combination of the 10 resonator responses provides a broad dip with a width of ~1.2 nm, 4× the width of an individual resonator dip, with visible signs of individual resonator dips. In order to use this device in a tunable delay such as the current invention, there is a need for each of the resonators to be aligned with each other, at least for the zero detuning setting of the delay. Because of the resonance frequency non-uniformity, this requires individual control of each of the resonators, plus a measurement of each resonator to find its resonance frequency relative to the design, so that the resonator can be tuned to the design frequency. This adds significant complication to the use of this device in a practical application.

There is a need to provide a tunable delay with a broader bandwidth in order to support optical signals with broader bandwidth.

SUMMARY OF INVENTION

This invention provides a device for a tunable delay of an optical signal, comprising at least a first super-ring structure, which includes multiple resonators, receiving an input light. Resonant frequencies of these resonators are distributed around central frequency $\omega_1$. In one embodiment the resonator are made with predetermined distribution of resonant frequencies, and in another embodiment, the resonators are made with resonant frequencies randomly distributed around $\omega_1$ forming a Gaussian distribution with a given mean square deviation $\delta\omega$. The resonators are coupled to a waveguide. In one embodiment the resonators are ring resonators having a radius ranging from about 2 μm to about 50 μm.

The output light characteristics are determined by the first super-ring characteristics, which are different from characteristics of a single loop resonator. The optical device of the present invention may provide a tunable phase delay or a tunable group delay, with much broader bandwidth that a single loop resonator. A group delay up to 10 ns can be achieved. A peak delay of the super-ring is larger than a peak delay of a single resonator.

In the preferred embodiment an input signal is a complex signal having multiple frequency components, and the device is providing an equal group delay to all frequency components in the output signal. Such arrangement allows eliminating a third order group delay dispersion over all frequencies of the input optical signal; this is achieved using cancellation of a positive dispersion of the first loop resonator by a negative dispersion of equal magnitude of the second loop resonator.

In the preferred embodiment the angular resonant frequencies are tunable. The super-ring is tuned with a single control, which can be a single temperature, a single voltage or a single current to control the central frequency of the full super-ring response.

The tunability is achieved either by thermo-optical effect, by quantum confined Stark effect, by carrier injection, by Franz-Keldysh effect, by Pockels effect (depending on material) or by MEMS. The resonant angular frequencies $\omega_1$ and $\omega_2$ may be tunable within a range of +/-0.1% within 10 microseconds. In one embodiment the resonant angular frequencies $\omega_1$ and $\omega_2$ are tunable slowly using thermo-optical effect followed by a fast tuning using carrier injection or Stark effect.

The loop resonators may be any form of optical resonator structure, tunable resonator or filter, including micro-ring resonators, Bragg gratings, photonic crystals, free space resonators, both 2D and 3D.

In one embodiment the device may include a second super-ring with multiple resonators having angular resonant frequencies around $\omega_2$. If $\omega_0$ is a median frequency of the input optical signal, the resonant frequencies of the super-rings are $\omega_1=\omega_0-\Delta\omega$ and $\omega_2=\omega_0+\Delta\omega$ respectively, and $\Delta\omega$ is a deviation from the median frequency.

In the preferred embodiment a balanced thermal tuning is applied, which includes simultaneous thermal tuning up and down the $\omega_1$ and $\omega_2$ resonators respectively. In order to increase the tuning speed of the device, an electrical waveform applied to micro-heaters tuning the resonators is modified.

It is another object of the present invention to provide an improved control of the resonators and achieve improved device response with less strict requirements to the resonator's characteristics to be identical. The device comprises N first loop resonators forming a first super-ring controlled by a first bias voltage, (N≥2), and N second loop resonators forming a second super-ring controlled by a second bias voltage, the first and the second bias voltages shifting the center frequency of each group of resonators while the shape of the group response stays constant. The time delay tuning can be performed by a balanced thermal approach, which includes simultaneous thermal tuning up and down the first and second super-rings respectively. The difference in resonant frequencies of the resonators within each super-ring may be up to 2%. The super-ring provides on overall response (shape, width) that is defined by the distribution of the resonant frequency of the different resonators rather than the width of the resonance response of a single resonator. The super-ring must include enough individual resonators to create a reproducible response that follows the distribution shape of the resonance frequencies. The super-ring concept applies to other performance parameters of the group of resonators, including the loss, delay, phase change and dispersion response of the group of resonators as well as their tuning characteristics.

BRIEF DESCRIPTION OF DRAWINGS

FIG. 2. (a) A 'side-coupled integrated spaced sequence of resonators' (SCISSOR) structure; (b) a SCISSOR structure with the resonators coupling on the opposite sides of the core waveguide (prior art); (c) measured transmission spectrum for 10 resonators, showing a combined spectral dip ~1.2 nm from the combination of the 10 resonator dips, and a free-spectral-range of ~9.5 nm. Each individual resonator dip is ~0.3 nm wide.

DETAILED DESCRIPTION OF THE PREFERRED EMBODIMENT

Optical delay lines typically use near infrared (NIR) light, however the disclosure is not limited to this spectral range. The term "optical" in the present disclosure comprises visible, near infrared, infrared, far infrared and the near and far ultra-violet spectra.

The prior art shows that the phase shift in the SCISSOR delay line. (shown in FIG. 2 (a)) with N rings each having a round-trip time $\tau$ can be written as $$\tan\left(\frac{\Phi}{N}\right) = \frac{\kappa^2 \sin(\omega - \omega_r)\tau}{(1+\rho^2)\cos(\omega - \omega_r)\tau - 2\rho} \quad (1)$$

where the resonant frequency is $\omega_r = 2 \, m\pi\tau^{-1}$ and $\tau$ is around trip time, and the coupling between the resonator and waveguide is $\kappa = \sqrt{1-\rho^2}$ The group delay can then be written as $$T_d(\omega) = \frac{\partial \Phi(\omega)}{\partial \omega} \quad (2)$$

$$= N\tau \frac{1+\rho}{1-\rho} - N\tau^3 \frac{(1+\rho)\rho}{(1-\rho)^3}(\omega - \omega_r)^2 +$$

$$\frac{1}{12} N\tau^5 \frac{(1+\rho)\rho(1+10\rho+\rho^2)}{(1-\rho)^5}(\omega - \omega_r)^4 + \ldots =$$

$$= T_{d0} - N\beta_3(\omega - \omega_r)^2 + N\beta_5(\omega - \omega_r)^4 + \ldots$$

where we have introduced higher order group delay dispersion (GDD) terms $\beta_3$ and $\beta_5$. It is these terms that are responsible for the different delay experienced by different frequency components of the signal.

By adjusting the phase of the received signal by means of tunable delays, the sensitivity, directional gain and other aspects of the RF antenna can be controllably varied.

The present invention addresses tunability and the bandwidth expansion of SCISSOR not achievable in the prior art design.

Figure 3:
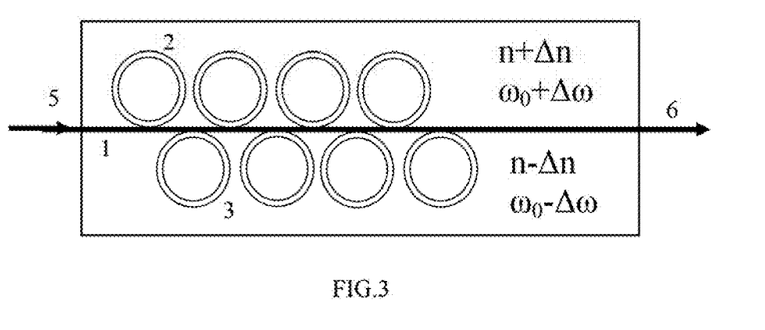
FIG. 3 A tunable delay based on two sets of resonators.

The novel delay line structure is shown in FIG. 3, where the resonant frequencies of rings are shifted by a small amount $\Delta\omega$ relative to $\omega_0$ (central frequency of the signal) i.e. $\omega_{1,2} = \omega_0 \pm \Delta\omega$ This can be accomplished by changing the effective refractive index on the two sides of the central bus. An input optical signal is introduced in the waveguide 1 and coupled in and out the first resonator 2 having an angular resonant frequency $\omega_1$. The output signal from the first resonator then coupled in and out of the second resonator 3 with an angular resonant frequency $\omega_2$. In the preferred embodiment the device has more than one pair of resonators with $\omega_1$ and $\omega_2$. One set of resonators (shown on one side of the waveguide) have angular resonant frequency $\omega_1$, while another set of resonators (shown on the opposite side of the waveguide) have angular resonant frequency $\omega_2$. Each set may contain tens of the resonators. When the input optical signal 5 is a complex signal having multiple frequency components, this device provides an equal group delay to all frequency components in the output signal 6. This is achieved by eliminating a third order group delay dispersion over all frequencies of the input optical signal using cancellation of a positive dispersion of the first loop resonator by a negative dispersion of equal magnitude of the second loop resonator.

The different resonant angular frequencies $\omega_1$ and $\omega_2$ may be achieved by different perimeters of the first and second resonators or by different effective refractive indices of the resonator waveguides. The resonator loop can be of any shape: ring, rectangular, etc.

Figure 4:
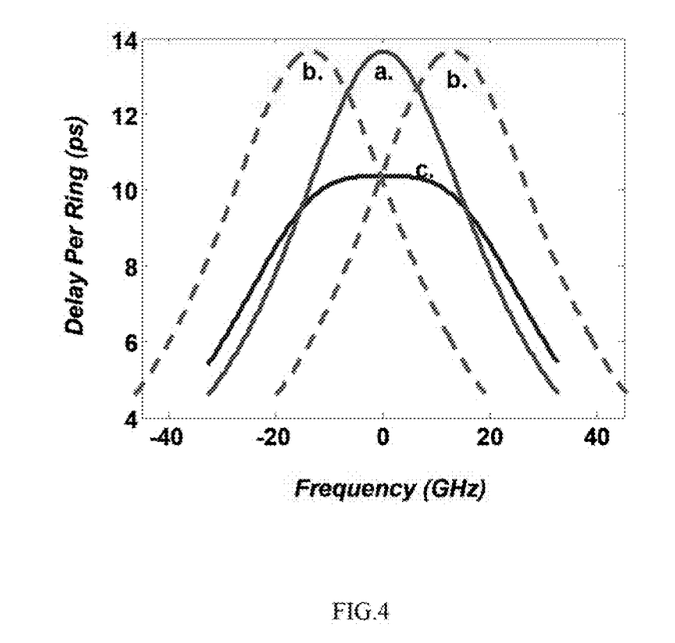
FIG. 4 Group delay spectra of the resonators with a. given resonance frequency $\omega_0$;
b. resonance frequency shifted by ±13 GHz;
c. two combined shifted resonators.

FIG. 4 shows the spectra of $T_{dl}(\omega)$—group delay per one ring for the structure with identical rings (curve a), the two shifted spectra $T_{dl}(\omega \pm \Delta\omega)$ for the "upper and lower rings" drawn by dashed lines and the resulting average curve $T_{dl} = T_{dl}(\omega + \Delta\omega)/2 + T_{dl}(\omega - \Delta\omega)/2$ which appears significantly flattened. This flattened curve provides a wider bandwidth of operation than previous designs. As an example, we use the rings with round trip time $\tau$=0.22 ps and $\kappa$=0.25. The detuning $\Delta\nu = (2\pi)^{-1}\Delta\omega$ in FIG. 4 was taken to be 13 GHz. Changing $\Delta\omega$ will affect both magnitude of group delay and its spectral width, thus providing a way for tunability, but with certain bandwidth restrictions.

The analytical estimation of the system performance uses an expression for the group delay in the "shifted" SCISSOR with power series approach applied.

The expression for the group delay is the following $$T_d(\omega) = T_{d0} - \frac{N}{2}\beta_3^{(1)}(\omega-\omega_0-\Delta\omega)^2 - \frac{N}{2}\beta_3^{(2)}(\omega-\omega_r+\Delta\omega)^2 + \quad (3)$$

$$\frac{N}{2}\beta_5^{(1)}(\omega-\omega_0-\Delta\omega)^4 + \frac{N}{2}\beta_5^{(2)}(\omega-\omega_0+\Delta\omega)^4 \ldots \approx \approx$$

$$T_{d0} - N\beta_3\Delta\omega^2 + N\beta_5\Delta\omega^4 - N[\beta_3-6\beta_5\Delta\omega^2](\omega-\omega_r)^2 +$$

$$N[\beta_5 - 15\beta_7\Delta\omega^2](\omega-\omega_0)^4$$

Now, if the condition $$\Delta\omega_0^2 = \frac{\beta_3}{6\beta_5} = \frac{2(1-\rho)^2}{(1+10\rho+\rho^2)}\tau^{-2} \approx \frac{(1-\rho)^2}{6}\tau^{-2} \quad (4)$$

is satisfied, the third order dispersion is eliminated, and a following expression is obtained for the delay time $$T_d(\omega_0) = T_{d0} - \frac{5}{6}N\beta_3\Delta\omega_0^2 + N\beta_5'(\omega-\omega_r)^4 = \quad (5)$$

$$T_{d0} - \frac{5}{3}\frac{\rho}{1+10\rho+\rho^2}T_{d0} + N\beta_5'(\omega-\omega_r)^4 \approx \frac{31}{36}T_{d0} + N\beta_5'(\omega-\omega_r)^4$$

which is only about 15% less than the delay in the simple SCISSOR. Note that the delay spectrum curve of FIG. 4.*c* becomes flattened.

The important result is the fact that by changing Δω in the vicinity of Δω₀ one can achieve a tunable delay. By differentiating (3) with respect to detuning Δω one obtains $$\left.\frac{dT_d}{d\Delta\omega}\right|_{\Delta\omega_0} = -2N\Delta\omega[\beta_3-2N\beta_5\Delta\omega^2]_{\Delta\omega_0} \quad (6)$$

$$= -\frac{4}{3}N\beta_3\Delta\omega_0$$

$$= -\frac{4}{3\sqrt{6}}N\tau^2\frac{(1+\rho)\rho}{(1-\rho)^2}$$

$$= -\frac{4}{3\sqrt{6}}T_d\frac{\rho\tau}{1-\rho}$$

The expression for the resonant frequency change Δω as a function of refractive index change Δn that causes this change is the following $$\Delta\omega = f\omega_r\Delta n/n \quad (7)$$

Where f is the effective fraction of circumference in which the refractive index actually can get changed. Thus the time delay is $$\Delta T_d = -\frac{4}{3\sqrt{6}}T_d\frac{\rho f\omega_r\tau}{1-\rho}\frac{\Delta n}{n} = -\frac{8\pi}{3\sqrt{6}}\frac{\rho}{1-\rho}\frac{fL\Delta n}{\lambda_0}T_d \quad (8)$$

Figure 5:
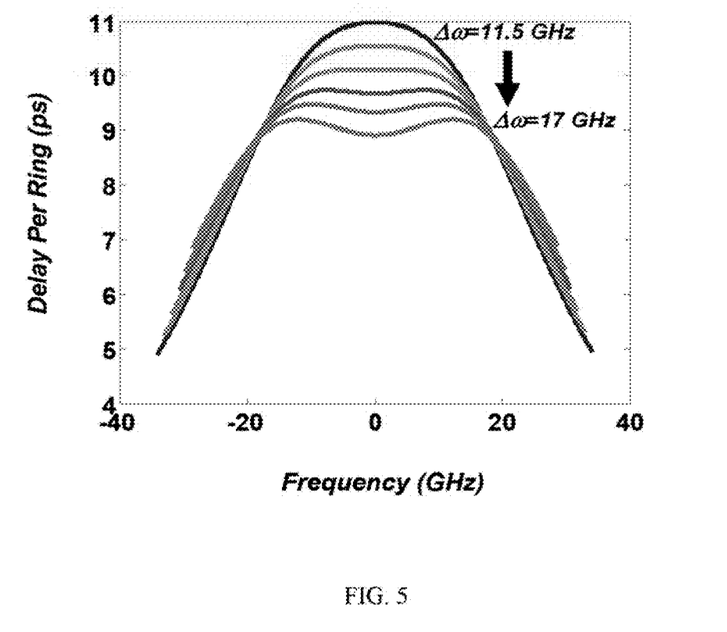
FIG. 5 Group delay spectra of "compensated shifted resonator" delay line for different amounts of detuning.

Changing refractive index by 0.1% changes the delay by 50%. FIG. 5 presents the result of numerical modeling of the same structure with κ=0.25 and the detuning varying from 11.5 GHz to 17 GHz.

Figure 6:
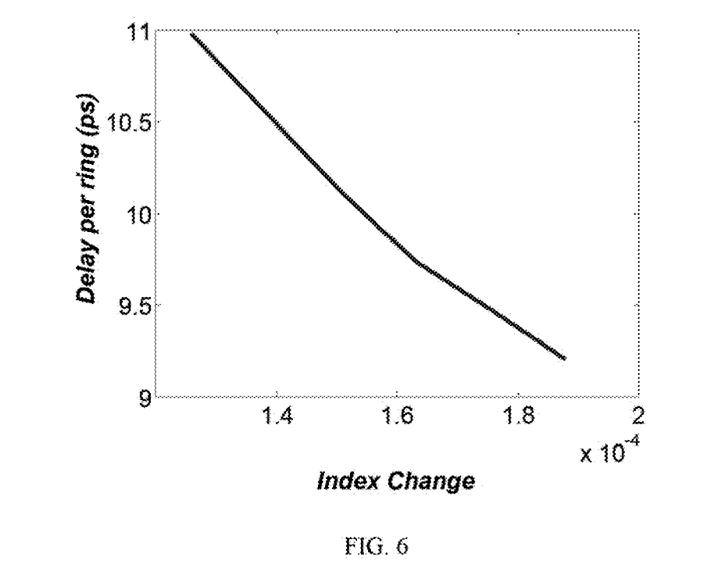
FIG. 6 A delay per ring as a function of index change.

A tunability of about 2 ps per ring can be achieved as the shape of group delay spectra changes. In fact the "camelback spectra" achieved with larger detuning may be better for a double-sideband modulated signal than the flatter curve attained with optimum detuning. The value of maximum group delay as a function of index change (for the effective index of about 2.2) is shown in FIG. 6.

Figure 7:
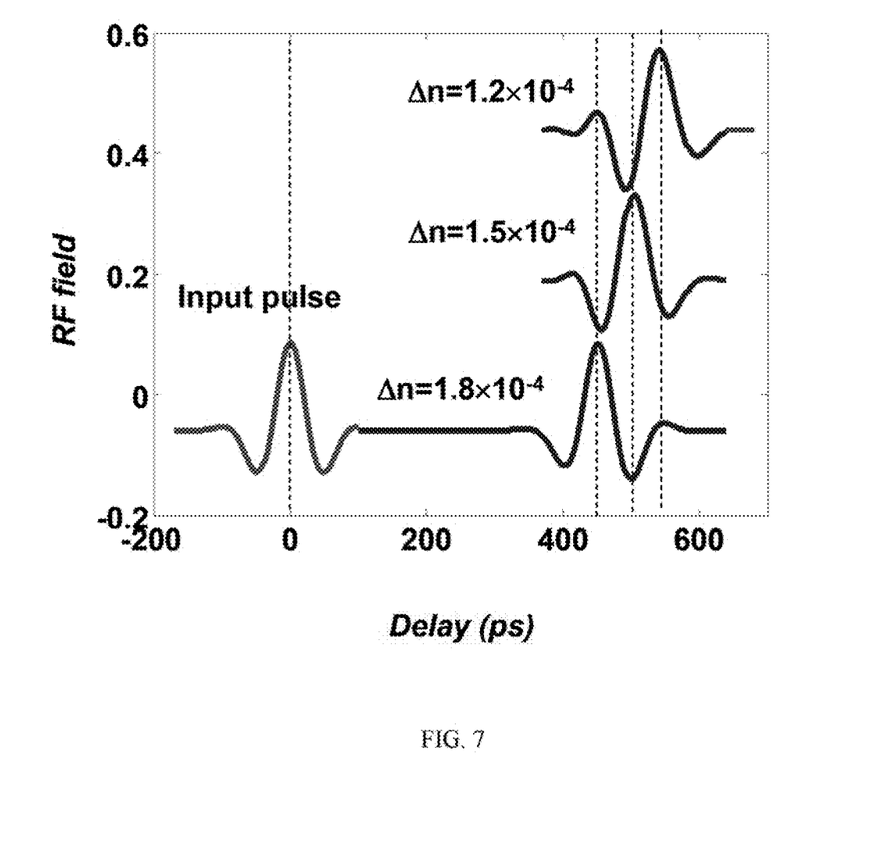
FIG. 7 A tunable delay of RF pulses using compensated shifted resonator with 50 rings.

The results are consistent with the rough estimate obtained before—a reasonably small (less than $10^{-3}$) change in refractive index can accomplish fairly large fractional change in the delay time. Therefore, it appears that the main limitation is not the limited ability to change index but still the dispersion of group delay. Its impact can be estimated as follows:

FIG. 7 shows the evolution of a 100 ps pulse through the delay line of FIG. 3 consisting of N=50 rings for different values of the refractive index change. The results show that one can achieve delays of about 100 ps (from 450 to 550 ps) which is more that sufficient to achieve full 180 degrees rotation in a phased array antenna designed with a central frequency of 8.8 GHz. One can see that GDD plays an important role even in the compensated scheme but note that the total (fixed) delay exceeds the one in the un-compensated scheme by a factor of 5 or so.

A variety of technologies could be used for the tunable delay fabrication, including silicon, silicon nitride, silicon germanium, III-V semiconductors such as gallium arsenide and indium phosphide, polymers and other optical waveguide materials. In the preferred embodiment an active device is provided including a silicon substrate, an insulator layer, and a top silicon layer, in which the device is fabricated. The top silicon layer could be replaced by a strained silicon germanium layer. The device is electronically controlled by injected carriers or by applying an electric field. For this, the loops are made from a semiconductor, such as Si with lower layer being n-doped, upper layer p-doped and the layer in between undoped. When a forward bias (+ to the top layer) is applied, carriers (electrons and holes) are injected into the undoped region and they increase the effective refractive index of the material, causing the change of the angular resonant frequency.

In another embodiment the resonator angular frequency is tuned using, the quantum confined Stark effect. For this, the loops are made from direct-bandgap semiconductor quantum wells, such as: GaAs or InP, with the lower layer being n-doped, the upper layer p-doped and the layer in between undoped. When a reverse bias (to the top layer) is applied, the applied field increases the effective refractive index, causing a change of the angular resonant frequency. Additional tuning technologies including the Franz-Keldysh effect, the Pockels effect or physical tuning of the resonator using MEMS technology can be used.

The resonant angular frequencies $\omega_1$ and $\omega_2$ may be tunable within a range of +/−0.1% within 10 microseconds using these technologies.

In a different embodiment another (slower) technology is used, which includes silicon or silica waveguides on a silicon wafer. These devices use thermal tuning by applying a heater on the resonator or waveguide structure to change the refractive index. Devices used for the results shown in FIG. 2(*c*) utilize silicon waveguides on a silicon dioxide insulator on top of a silicon substrate, known as silicon on insulator (SOD, with electrical heaters for tuning placed above the silicon resonators. "Hydex" material, produced by Infinera, Calif. can also be used for this kind of thermally tuned device; this material has a refractive index between that of silicon and silica. Devices could also be fabricated in III-V compound semiconductors, such as InP or GaAs.

Figure 8:
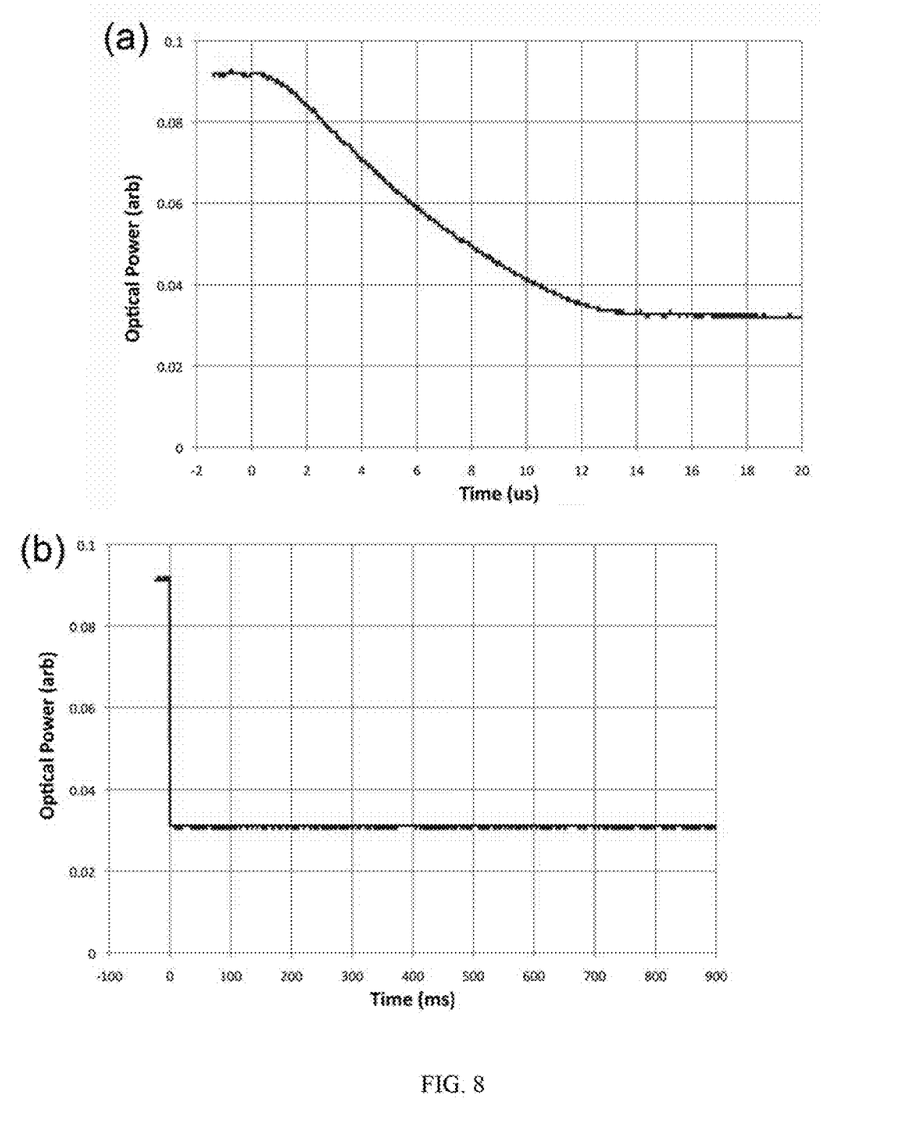
FIG. 8 A transient tuning measurement showing the change in output power versus time (proportional to delay versus time) with a fast tuning transient, shown on a short timescale of 20 microseconds (a) and on a long timescale of 900 milliseconds (b).

One key advantage of the present invention is that it uses a balanced approach, in that one set of resonators is tuned up in frequency while at the same time the other set is tuned down in frequency by the same amount. When using thermal tuning to achieve the changes in resonator frequency, this provides a balanced thermal approach, in which heat is added to one set of resonators while at the same time the same amount of heat is removed from the other set of resonators. In this way the total heat provided to the device remains constant, and therefore any potential effects on the device performance due to longer time constants are totally eliminated. The elimination of longer time constants, associated with the thermal time constant of the full device, the mount, heatsink and temperature control electronics are eliminated using this balanced thermal approach, which has been validated by measurements of the transient fast tuning of devices using the present invention, as shown in FIG. 8. This idea works for any thermal driven device where the operation can be achieved with such a 'balanced' scheme; increasing heating to some of the elements while decreasing to the others, keeping the total heating constant.

Figure 9:
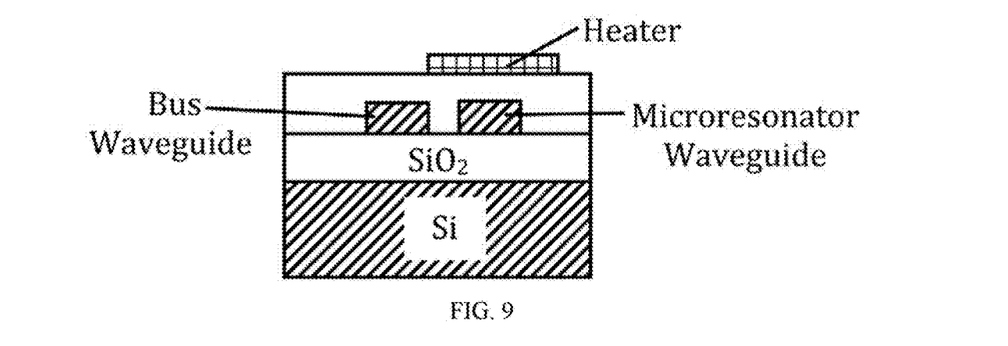
FIG. 9 A resonator structure with a micro-heater placed directly on top of the SiO2 layer which covers the resonator ring.
Figure 10:
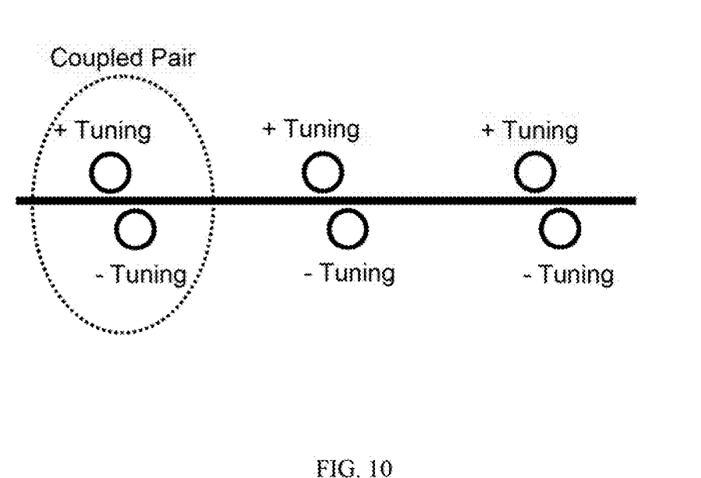
FIG. 10 Two resonators positioned close together to, form a coupled thermal pair.

There is a need to produce fast tuning of the device, aiming for 'microsecond tuning times', e.g. less than ten microseconds. Different approaches are proposed to improve the tuning time:

1) To achieve fast tuning speeds in the microsecond range, consider an implementation of the device with micro-heaters placed very close on top of the resonator rings, as shown in FIG. 9. The close positioning of the micro-heaters next to the resonators provides extremely fast tuning, however, the balanced thermal approach only provides an overall neutral thermal effect when the increased heating from one resonator is balanced by the reduced heating from another resonator. In order to reduce the time taken for this to occur, it is proposed that pairs of resonators are placed very close together so that they operate as a coupled pair: one is thermally tuned up, the other down, so the overall thermal effect is neutral. By having the two resonators very close to each other, as shown in FIG. 10, the thermal time constant becomes smaller as the temperature changes become more localized to the two rings.

2) Electrical pre-emphasis: in this approach, the electrical waveform to the micro-heaters is modified in order to increase the tuning speed of the device. In the non pre-emphasis case, the drive voltage to the micro-heater is changed from one value to another to provide the required tuning. The first pre-emphasis approach is to provide an overshoot (undershoot) to increase heating (reduce heating) to the resonators in order to get to the final required temperature quicker. Such an overshoot may be an increase in drive voltage for one microsecond to a higher value than the final value to provide increased heating quickly, or conversely, the drive voltage may be reduced to a lower value that the final value in order to provide reduced heating quickly. The maximum undershoot that can be obtained is by turning the driver voltages to zero, which would be balanced by an associated increase in heat delivered to the other resonators. An extension of this relatively simple undershoot/overshoot pre-emphasis approach is to generate a more complex electrical drive waveform designed so that the resonators achieve their final temperatures in the quickest time, therefore maximizing tuning speed.

3) Another approach is associated with the resonator design itself. Reducing the thickness of insulating layers in the device as much as possible without adversely affecting the delay performance allows thermal equilibrium to occur more quickly, e.g. using a thinner SiO2 layer, or removing the SiO2 layer where it is not needed.

4) Another approach is to improve the heatsinking of the resonators to reduce the cooling time-constant, which can, depending on the design, be slower than the heating time-constant. Heatsinking can be improved by adding gold traces on top of the device to improve thermal conduction from a resonator (laterally) to the substrate and also improve thermal conduction between resonators, therefore reducing the thermal time constant of the device. Another way to improve heatsinking is to add a conductive element (e.g. another substrate) on top of the device (e.g. flip chip) to provide improved thermal conduction and therefore a shorter time constant and faster tuning. The downside of these approaches is that they will increase the necessary heating power to obtain a specific temperature on the resonator, so there is a tradeoff between tuning speed and device power dissipation.

It is another object of the present invention to provide a method for producing an optical signal delay. The method comprises introducing an input optical signal having multiple frequencies in a waveguide, coupling the optical signal to a first loop resonator; then coupling the optical signal outputted by the first resonator to a second loop resonator; outputting a delayed optical signal, wherein all frequencies of the input optical signal have the same group delay. The first and the second loop resonator have different angular resonant frequencies as shown in FIG. 3. These resonant angular frequencies $\omega_1$ and $\omega_2$ may be tuned by the same value $\Delta\omega$ thus tuning the group delay of the output optical signal.

In the preferred embodiment of the present invention, a series of ring resonators is used in the device design, often referred to as microresonators or micro-ring resonators, which includes resonators that may be circular, racetrack or of any arbitrary shape. However, the invention is not limited to such configuration. Other embodiments include all variety of resonator types. The invention addresses an assembly of one or more pairs of tunable resonators or filters (or just responses), which when combined together provide the required overall tuning response, that is, a broad range of tunability of the overall group delay (time delay) with limited distortion. The resonators/filters are tuned in opposite directions (in wavelength) so that the combined group delay at the center wavelength between the two resonators/filters is tuned up or down as the responses move away from or towards each other. This approach is applicable to any types of resonators or filters than can be combined (amplitude and phase responses) to give the desired response, which includes micro-ring resonators, Bragg gratings, photonic crystals, free space resonators or some other form of optical resonator or filter of some sort. The device does not need to be flat, and it can also be in 3D—some resonators are spherical, and any kind of 2D or 3D structure could potentially be used. The refractive index is changed in one implementation, but it is also possible to change the coupling coefficient to tune the rings through a physical mechanical movement using MEMS. In another embodiment, the refractive index is kept unchanged while the device is tuned by changing its size.

In order to utilize the present invention it is necessary to align all of the resonators to the same optical frequency for the zero detuning case, which would optimally occur when the same bias is applied to each resonator—if all resonators are identical and have the same resonance frequency and tuning characteristics, they will align at the same optical frequency for the same bias. For the current invention, one set of resonators would be connected together and their bias set by a single control, e.g. voltage, allowing them to be tuned together down in frequency, while the other set of resonators would be connected together and controlled by another single voltage, allowing them to be tuned together up in frequency.

This approach requires only two voltages to control the delay for any number of resonators. If the resonators are not identical, and each has its own resonance frequency, as shown in the optical transmission spectrum in FIG. 2(c), then the resultant spectrum when all resonators are biased at the same value will be wider than that of a single resonator, and will have random variations due to the addition of responses from each of the resonators to create the overall response. In this case each of the resonators will require its own bias voltage in order to provide the correct bias to set the resonator to the correct frequency. For a device with 20 resonators this would require 20 voltages, or it may be possible to reduce that number by combining together resonators with the same resonant frequency, to reduce the overall number of voltages required.

In order to overcome the problem of non-uniformity in resonator resonance frequency, requiring individual control of the bias of each resonator, to enable the current invention to be applied with two bias voltages, we propose that the resonators on a device are split into two separate groups, referred to as 'super-rings', which are addressed by two bias voltages, and that the number of resonators in each super-ring is increased to the point where the shape of the combined response of a super-ring follows the distribution shape of resonance frequency for those resonators, rather than the response shape of the individual resonators making up the super-ring. This depends on both the distribution width (e.g. a normal distribution for the variation in resonance frequency of different resonators on a device, due to e.g. processing variations in device fabrication) compared to the width of the resonator resonance shape, and the number of resonators. By first minimizing the distribution of the resonance frequencies of resonators on a single device, through e.g. tighter processing controls, and then increasing the number of resonators on the device, it is possible to provide a device where the response of each super-ring has a defined shape (from the distribution shape and the individual resonator response). The two super-rings can then be controlled by two voltages, which will shift the center frequency of each super-ring while the shape of the super-ring response stays constant. In this way, the two super-rings can be used for the current invention. Additionally, because the super-ring shape has a much larger bandwidth than a single resonator, the current invention utilizing two super-rings will also have much larger bandwidth, providing an approach to further increase the operating bandwidth of the invention.

Figure 11:
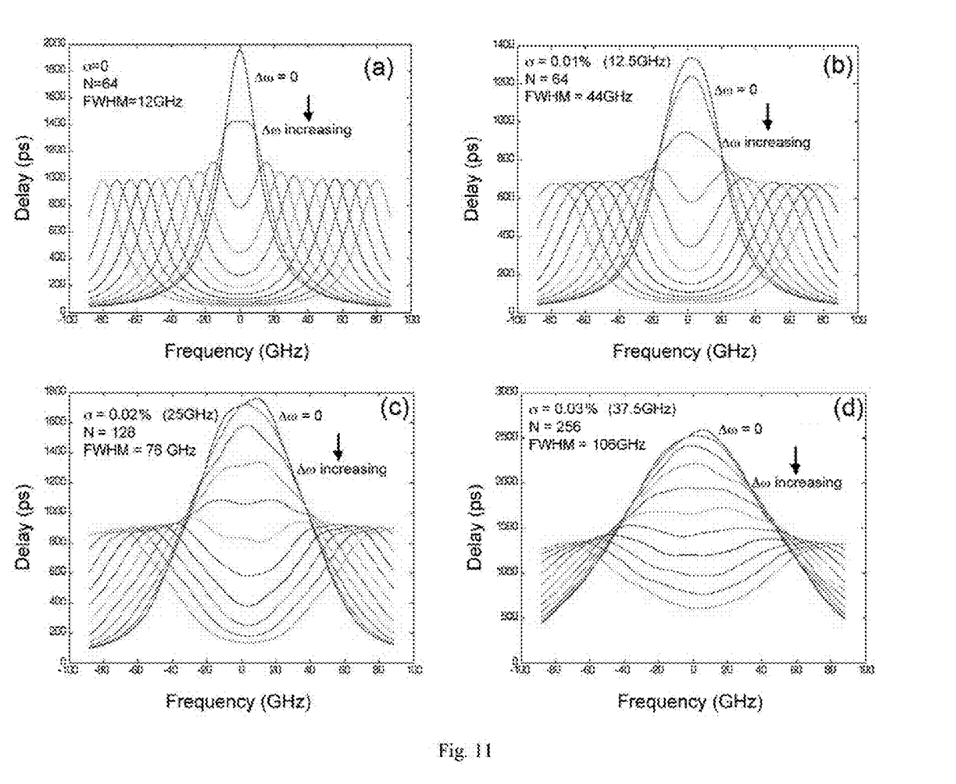
FIG. 11 Simulated responses for delay versus offset from center frequency for a) 64 resonators with center frequency aligned, i.e. $\sigma$=0, FWHM=12 GHz, b) 64 resonators with center frequency distributed, $\sigma$=0.01% of free spectral range (FSR)=12.5 GHz, FWHM=44 GHz, c) 128 resonators with center frequency distributed, $\sigma$=0.02% FSR=25 GHz, FWHM=76 GHz, d) 256 resonators with center frequency distributed, $\sigma$=0.03% FSR 37.5 GHz, FWHM=106 GHz.

Simulations were carried out to validate the use of super-rings to overcome the non-uniformity of resonator resonance frequency and allow the current invention to be used with only two drive voltages. FIG. 11 (a) shows the response of the current invention for 64 resonators whose resonance frequencies are all aligned—the reference case, where the normal distribution sigma is 0. The plot shows the combined response of the 64 resonators; the central curve with the maximum delay at 0 GHz corresponds to a detuning of 0 GHz, the other traces correspond to detuning values increasing from 8 GHz to 80 GHz in steps of 8 GHz. The FWHM of the central curve is 12 GHz, which is the FWHM of each individual resonator in this simulation. Using the current invention, varying the detuning from 0 GHz to 80 GHz, the delay is varied from a maximum of almost 2000 ps to a minimum of ~30 ps. FIG. 11(b) shows the same simulation, however, in this case the resonance frequencies of the resonators are spread around 0 GHz using a normal distribution, with the sigma equal to 0.01% of the free spectral range, which is 12.5 GHz. The central response curve is significantly broader than the case for sigma=0, having a FWHM of 44 GHz. The delay changes as the detuning is increased using to the current invention, however, the total delay is reduced due to the spreading of the resonator resonance frequencies, while the bandwidth of the response is increased, also due to the spreading of the resonator resonance frequencies. This approach therefore provides a tradeoff between maximum delay and the bandwidth of the delay. The plots in FIG. 11(c), d show similar simulations but for a larger number of resonators (128 and 256) and for a larger sigma (0.02% FSR:25 GHz, and 0.03% FSR:37.5 GHz). In FIG. 11 (c) the central response FWHM is 76 GHz, while in FIG. 11 (d) the central response FWHM is 106 GHz, and both plots show the inherent increase in bandwidth from this approach that is obtained as the sigma increases. As the sigma is increased, the number of resonators required to provide a defined super-ring response also increases.

Figure 12:
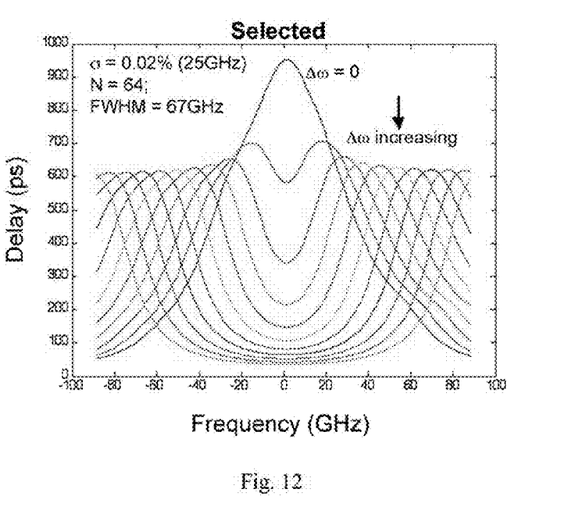
FIG. 12 Simulated responses for delay versus offset from center frequency for 64 resonators with center frequency distributed, $\sigma$=0.02% FSR=25 GHz, FWHM=67 GHz. The resonators are selected; the highest 32 resonance frequencies in one super-group and the lowest 32 in the other super-group.

In addition to the use of super-rings to provide a controllable response shape with only two drive voltages in the presence of non-uniformity of resonance frequency, it is possible to obtain a controllable response shape with a smaller number of resonators and the same sigma value by selection of the two groups of resonators making up each super-ring. In this case resonators with higher resonance frequencies are selected for one super-ring, and resonators with lower resonance frequencies are selected for the other super-ring. In this way the distributions of resonances in each super-ring are smaller, and so the number of rings required for a fixed sigma value is reduced. Because each super-ring is selected from a normal distribution, their response will be asymmetric, and so the bandwidth of the overall response will be narrower than the case with no selection—this is shown in FIG. 12, which uses only 64 resonators to obtain a controllable shape response with a sigma of 0.02% (128 resonators were used in FIG. 12c for sigma=0.02% with no selection).

Figure 13:
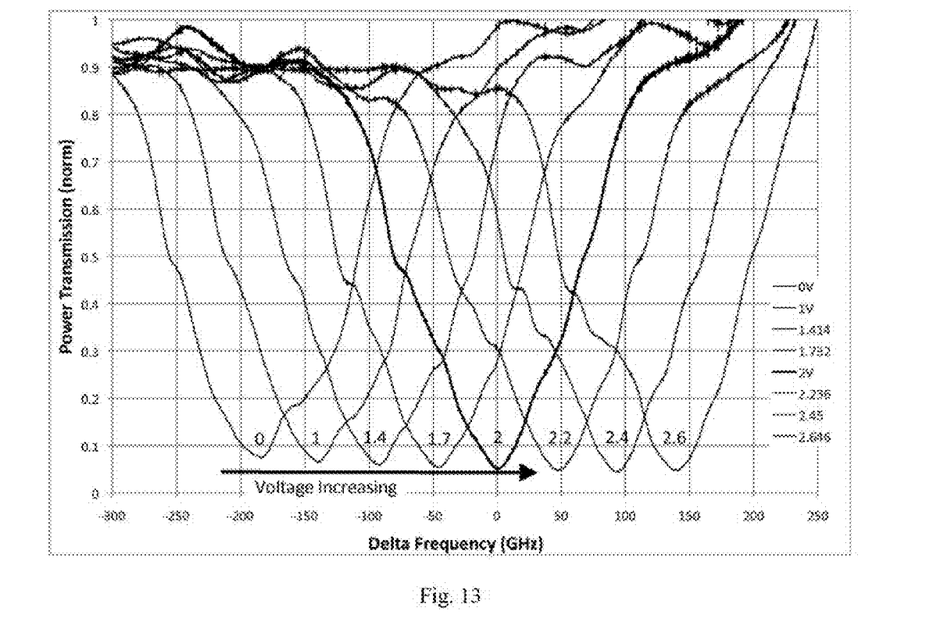
FIG. 13 Measured transmission spectra versus delta frequency for a device with 20 resonators, with each microresontor connected to the same drive voltage, forming a superring. The central dip (2 volts) is defined as zero frequency, which occurs at a wavelength of 1548.6 nm. The response FWHM is approximately 140 GHz (1.1 nm). Transmission spectra are measured for a series of voltages, the sequence of drive voltages is increased linearly in voltage squared (proportional to the power to heaters), showing a consistent tuning for each step of approximately 46 GHz.

Measurements of a device including 20 resonators were used to validate the super-ring concept. FIG. 13 shows measured transmission spectra for the device, which is operated with all ring heaters driven by the same drive voltage, thereby creating a super-ring. The first trace (0 volts) was taken for all resonator heaters unbiased, and the resultant response shows the resonance dip due to absorption in the rings. The drive voltage to all heaters is increased in a sequence to provide a linear increase in the voltage squared, therefore providing a linear increase in heating to the resonators, which provides the linear tuning of the response seen in FIG. 13. The FWHM of the super-ring response is approximately 140 GHz (1.1 nm), significantly larger than the FWHM of the individual resonators that make up the super-ring, which is about 37 GHz (0.3 nm). A sequence of 8 transmission spectra are shown for linearly increased heating to the resonators that make up the super-ring. The frequency of minimum dip of the central response (at 2 Volts) is used as the optical frequency for the device; this is at 1548.6 nm for the measured device.

Figure 14:
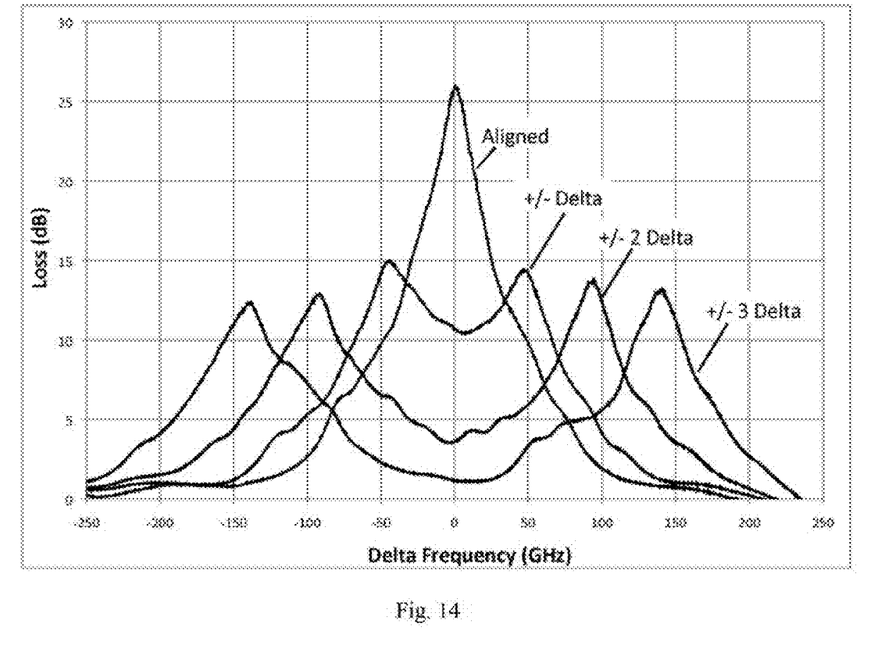
FIG. 14 Loss spectra predicted using the experimental results in FIG. 13, for a device utilizing two such super-rings, each including 20 resonators. Traces for both super-rings initially aligned at zero Delta frequency, tuned +/−delta (delta ~46 GHz), +/−2 delta and +/−3 delta.

In order to simulate the current invention using the measurements in FIG. 13, a device including two super-rings is considered, each super-ring including 20 resonators and having the performance characteristics shown in FIG. 13 (e.g. total of 40 resonators). With the two super-rings aligned at the same center frequency, the central response (aligned) shown in FIG. 14 is found. The loss spectra in dB are shown in FIG. 14, which mirror the delay expected from the device, as loss is proportional to delay for this device design, which has been shown experimentally. With the 2 super-rings detuned from the center frequency by +/−delta, where delta from the measurements in FIG. 13 is ~46 GHz, the loss (delay) is tuned to a lower value. Increasing the detuning to +/−2 delta and then +/−3 delta further tunes the loss (delay) of the device. The optical bandwidth that can be delayed by this super-ring based device is significantly increased from that using the individual resonators if they are aligned in optical frequency.

The results in FIG. 14 validate the super-ring concept using only 20 resonators in each super-ring. A larger number of resonators in each super-ring will provide a more reproducible super-ring response shape, and therefore a cleaner and more reproducible (from device to device) tunable delay. Increasing the number of resonators in each super-ring creates a larger tunable delay, without the need for more than two drive signals (voltages).

The response shape and width of the super-ring in FIG. 14 is due to process variations of some parameter(s) of the device, which may include variations in waveguide width from photolithography or material thickness variations from the original SOI wafer. These variations will follow a distribution that will define the ultimate response shape of the super-ring. Additionally, as part of this invention, it is possible to obtain a desired distribution of super-ring parameters by specifically designing the required distribution into the device. This may include varying waveguide widths, resonator radius, of other key aspects of the designs from one resonator to the next in order to engineer the ultimate response of the super-ring. This approach allows the design of devices with significantly broader bandwidth, or more control of some other desired response, than would be obtained by just relying on known process variations. Additionally, process variations can be purposefully increased in order to obtain the desired performance characteristics.

A single super-ring can be used to replace a single resonator in any resonator based design, such as in a filter, a dispersion compensator or to provide phase delay or group delay. Replacing a single resonator with a super-ring can provide much broader bandwidth and also much larger response than a single resonator, where the response may be delay, loss, phase change, dispersion or other characteristic of the design. Additionally, a super-ring can be used as a replacement for a group of resonators in any resonator based design, providing much broader bandwidth.

The super-ring is tuned by a single control, such as a drive voltage, current or temperature, which tunes the entire response of the super-ring as shown in FIG. 14. The single control tuning of a super-ring allows it to replace a single resonator in any tunable resonator based design, such as a tunable filter, a tunable dispersion compensator or to provide tunable phase delay or tunable group delay, providing tunability plus wider bandwidth and also larger peak delay, loss, phase change and dispersion than a single resonator. The single control tuning of a super-ring also allows it to replace multiple resonators in any tunable resonator based design, providing tunability with a wider bandwidth, and also overcoming limitations from the non-uniformity of the individual resonator response that require separate control of each resonator.

Another object of the present invention is the use of the super-rings within a microwave photonic delay line that utilizes separate tuning of the optical carrier, as described in U.S. Pat. No. 7,558,450 B2 (Jul. 7, 2009). In this scheme, known as Separate Carrier Tuning Balanced SCISSOR (SCTB SCISSOR), two sets of resonators are utilized in the current invention to provide tunable delay to the sideband of a single-sideband RF photonic signal, while one or more additional resonators are used to tune the phase of the optical carrier to provide a true-time-delay to the entire RF photonic signal. The two sets of resonators in the SCTB SCISSOR scheme can be replaced by two super-rings, which provide both wider bandwidth performance and also overcome the limitation from the non-uniformity of the individual resonator response that otherwise would require separate control of each resonator. In addition to replacing the two sets of resonators by two super-rings, the SCTB SCISSOR requires one or more two standard resonators for carrier tuning, which could be replaced by a third super-ring.

The super-ring invention includes the response of a group of resonators being defined by the distribution of one or more of the individual characteristics of a single resonator, including resonance frequency, resonance frequency tuning rate, resonance response width, resonance response amplitude— the resonance response itself can be one or more of the following characteristics; the phase change, the group delay, the loss, the group velocity dispersion or any parameter that describes the response. Additionally, the invention is defined for all variety of resonant structures; tunable resonators or filters (or just responses), including ring-resonators, micro-ring resonators, Bragg gratings, photonic crystals, free space resonators or some other form of optical resonator or filter, 2D or 3D (e.g. spherical).

While the above invention has been described with reference to specific embodiments, these embodiments are intended to be illustrative and not restrictive. The scope of the invention is indicated by the claims below, and all changes that come within the meaning and range of equivalents thereof are intended to be embraced therein.

What is claimed is:

1. An optical device, comprising: M loop resonators made with a first distribution of resonant frequencies around a central frequency $\omega_1$ (M≥2), M loop resonators form a first super-ring; the optical device receiving incoming light and outputting modified light, wherein the output light characteristics are determined by the first super-ring characteristics, which are different from characteristics of a single loop resonator, further comprising: M loop resonators made with a second distribution of resonant frequencies around a central frequency $\omega_2$ forming a second super-ring, (M≥2); the device outputting the signal, which is a time delayed version of the input signal (provided by a constant group delay of all wavelengths in the signal), wherein an output light signal is determined by both super-ring characteristics, which are different from characteristics of each single super-ring at $\omega_1$ and $\omega_2$, wherein the second super-ring contains the same M number of rings as the first super-ring thus providing the same group delay characteristic as the first super-ring, but with the opposite sign of the group delay dispersion on the signal which is centered between $\omega_1$ and $\omega_2$.

2. The optical device of claim 1, wherein the first distribution is Gaussian with a given mean square deviation $\Delta\omega_1$.

3. The optical device of claim 2, wherein $\Delta\omega \geq 0.02\, \omega_1$.

4. The optical device of claim 1, wherein the light is an electromagnetic wave with a frequency ranging from UV to infrared.

5. The optical device of claim 1 operating as a tunable filter; the device outputting a signal that is a filtered version of the input signal.

6. The optical device of claim 1 operating as a tunable dispersion compensator; the device outputting a signal modified by the addition of dispersion by the compensator.

7. The optical device of claim 1 operating to provide a tunable phase delay or a tunable group delay, with much broader bandwidth than a single loop resonator can provide.

8. The optical device of claim 7, wherein a peak delay of the first super-ring is larger than a peak delay of a single resonator.

9. The optical device of claim 1, wherein the first super-ring is tuned with a single control.

10. The optical device of claim 9, wherein the single control is a single temperature, a single voltage or a single current to control the central frequency of the full first super-ring response.

11. The optical device of claim 1, wherein the first distribution shape is specifically designed distribution.

12. The optical device of claim 1, wherein the loop resonator may be any form of optical resonator structure, tunable resonator or filter, including micro-ring resonators, Bragg gratings, photonic crystals, free space resonators, both 2D and 3D.

13. The optical device of claim 1, wherein an output signal bandwidth is wider than a bandwidth of a single loop resonator and wider than a bandwidth of a delay consisting of two resonators with $\omega_1$ and $\omega_2$ resonator frequencies.

14. The optical device of claim 1, wherein a peak delay is larger than a peak delay of a single resonator.

15. The optical device of claim 1, wherein the delay is tunable.

16. The optical device of claim 15, wherein the tuning is performed by simultaneous tuning up and down the first and second super-rings using a first and a second single controls applied to each super-ring respectively.

17. The optical device of claim 15, wherein the resonant angular frequencies $\omega_1$ and $\omega_2$ are tunable within a range of +/−0.1% within 10 microseconds.

18. The optical device of claim 15, wherein the tuning is performed by a balanced thermal approach, which includes simultaneous thermal tuning up and down the first and second super-rings respectively.

19. The optical device of claim 1, wherein the difference in resonant frequencies of the resonators within each super-ring is up to 2%.

20. The optical device of claim 1, wherein the incoming optical signal is an RF modulated optical carrier including a single frequency carrier and a single signal side band, and the device is providing a phase delay for the carrier and a group delay for the side band.

21. The optical device of claim 20, wherein the group delay is up to 10 ns.

22. The optical device of claim 1, wherein the central resonant angular frequencies $\omega_1=\omega_0+\Delta\omega$ and $\omega_2=\omega_0-\Delta\omega$ of the loop resonators being equally distant from a frequency $\omega_0$, wherein $\omega_0$ is an input signal median frequency.

\* \* \* \* \*